US008656182B2

(12) United States Patent
Homme et al.

(10) Patent No.: US 8,656,182 B2
(45) Date of Patent: Feb. 18, 2014

(54) SECURITY MECHANISM FOR DEVELOPMENTAL OPERATING SYSTEMS

(75) Inventors: Jeffrey M. Homme, Redmond, WA (US); Mariusz H. Jakubowski, Bellevue, WA (US); Jeremy S. Russell, Bellevue, WA (US); Scott A. Kupec, Kirkland, WA (US); Dragos C. Sambotin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/230,708

(22) Filed: Sep. 12, 2011

(65) Prior Publication Data

US 2013/0067238 A1    Mar. 14, 2013

(51) Int. Cl.
*H04L 9/32*    (2006.01)

(52) U.S. Cl.
USPC ............... 713/189; 712/193; 726/26; 726/27

(58) Field of Classification Search
USPC ......... 713/168–170, 176, 178, 181, 182, 189, 713/193; 726/26–30; 382/115–118, 124; 380/277

See application file for complete search history.

(56) References Cited

U.S. PATENT DOCUMENTS

| | | | |
|---|---|---|---|
| 6,910,132 B1 | 6/2005 | Bhattacharya | |
| 7,194,618 B1 * | 3/2007 | Suominen | 713/155 |
| 7,225,337 B2 * | 5/2007 | Baessler | 713/175 |
| 7,382,904 B2 * | 6/2008 | Lee | 382/124 |
| 8,023,773 B2 * | 9/2011 | Brunk et al. | 382/305 |
| 2006/0036873 A1 | 2/2006 | Ho et al. | |
| 2006/0195906 A1 | 8/2006 | Jin et al. | |
| 2011/0035805 A1 | 2/2011 | Barkan et al. | |

OTHER PUBLICATIONS

International Search Report and Written Opinion issued in PCT/US2011/055727, mailed Sep. 3, 2012, 7 pages.

* cited by examiner

*Primary Examiner* — Hosuk Song
(74) *Attorney, Agent, or Firm* — Glen Johnson; Andrew Sanders; Micky Minhas

(57) ABSTRACT

A security technique to reduce the risk of unauthorized release of a software object. The technique allows identification of an individual responsible for the unauthorized release by marking each object with information, which acts as a fingerprint from which a person manipulating the object in a development environment can be identified. The development environment may be configured to quickly and automatically mark the object whenever a manipulation that may precede an unauthorized release occurs. To prevent circumventing the security technique, the object may be configured to enforce a requirement for a valid fingerprint such that the object is disabled if the fingerprint is removed or altered. Despite the marking, personally identifiable information is not revealed because the fingerprint is generated through a one-way cryptographic function performed on identifying information.

15 Claims, 7 Drawing Sheets

SECURITY MECHANISM FOR DEVELOPMENTAL OPERATING SYSTEMS

BACKGROUND

New versions of operating systems for computing devices are of interest to many people, including ordinary computer users, parties seeking to make and distribute unauthorized copies of the operating system, manufacturers of competing operating systems and developers of applications to execute on the operating system. Sometimes, this level of interest leads some who have legitimate access to the code of the operating system while it is in development to reveal details of the new version before it is officially released.

There can be many undesired consequences for the manufacturer of an operating system when a version of the operating system is leaked in this way. Competitors may gain access to the operating system and use it improperly in competing with the operating system manufacturer. Though, even less malicious uses can be harmful. Pre-release leaks, for example, can reduce the cachet of new features in the operating system when it is officially released, thereby hurting sales. Also, problems can arise if the developmental version contains features that are not fully debugged, creating the erroneous perception that the final version of the operating system will not work well. Additionally, parties planning to make applications or components that interact with the new version of the operating system may implement their products based on the leaked development version, only to find that, when a version is officially released, their products do not work as intended because of changes to the operating system between the leak and the official release.

There are various ways that these leaks can occur. Sometimes, information about the new version of the operating system is leaked from within a development organization by someone within that organization making an unauthorized release of a build of the operating system. In a developmental organization, software source code may be maintained within developmental servers. These servers may include a configuration management system that tracks versions of files or other components holding the components of the operating system.

A large team of software developers may work on the source code. Each may check-out from the configuration management system pieces of the source code on which that developer is working. When a developer is done working on a piece of the software, that developer may check it into the configuration management system, allowing another developer to check it out and work on it.

From time to time, the latest version of the various components of the source code may be assembled into a build. In addition to collecting the latest version of each component of the operating system, a build server may convert the software source code into an executable form, creating an executable object for the build. This object may then be tested or otherwise used for legitimate purposes related to the development of the operating system. In some instances, the object may be stored on a distribution server from which others can make copies of the object for testing.

Leaks may occur at any point in the process. In some instances, leaks may occur when an unauthorized build is created. The object created as part of this build may be copied and distributed on the Internet or in other ways. As another example, the object to be leaked may be obtained from a distribution server.

SUMMARY

To reduce risks associated with leaks of objects, such as an object for a new version of an operating system under development, an object may be marked with a fingerprint of each person controlling an operation involving manipulation of the object. The operations for which such a fingerprint is applied may relate to creation of the object, copying of the object or moving of the object. Within a developmental entity, the fingerprint may be overwritten at each of multiple steps in the process of creation and distribution of the object, such that the fingerprint in an unauthorized object found external to the development organization may indicate the identity of the last person within the organization to manipulate the object. This information may provide a useful starting point in responding to leaks of objects.

Accordingly, in some aspects, the invention may relate to a method of processing a software object. The method may include, in conjunction with an action involving manipulation of the object, obtaining information identifying a person controlling the action. Obfuscated data may be cryptographically generated based on information identifying the person and information identifying the object. The obfuscated data may then be incorporated into the object.

In another aspect, the invention relates to a method of executing an object on a computing device. The method may include accessing a component of the object and determining whether the component is valid. The component may be validated by checking whether the component was signed with a predetermined key and checking whether the component contains information identifying the object. When the component is valid, the object may be executed. When the component is not valid, the object may be disabled.

In another aspect, the invention relates to at least one computer readable storage media comprising an object implementing an operating system. A kernel of the operating system may include a component that accesses security information incorporated in the object, accesses information identifying the object, and determines whether the security information is formatted as a valid fingerprint. When the security information is not formatted as a valid fingerprint, the component may disable the object.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
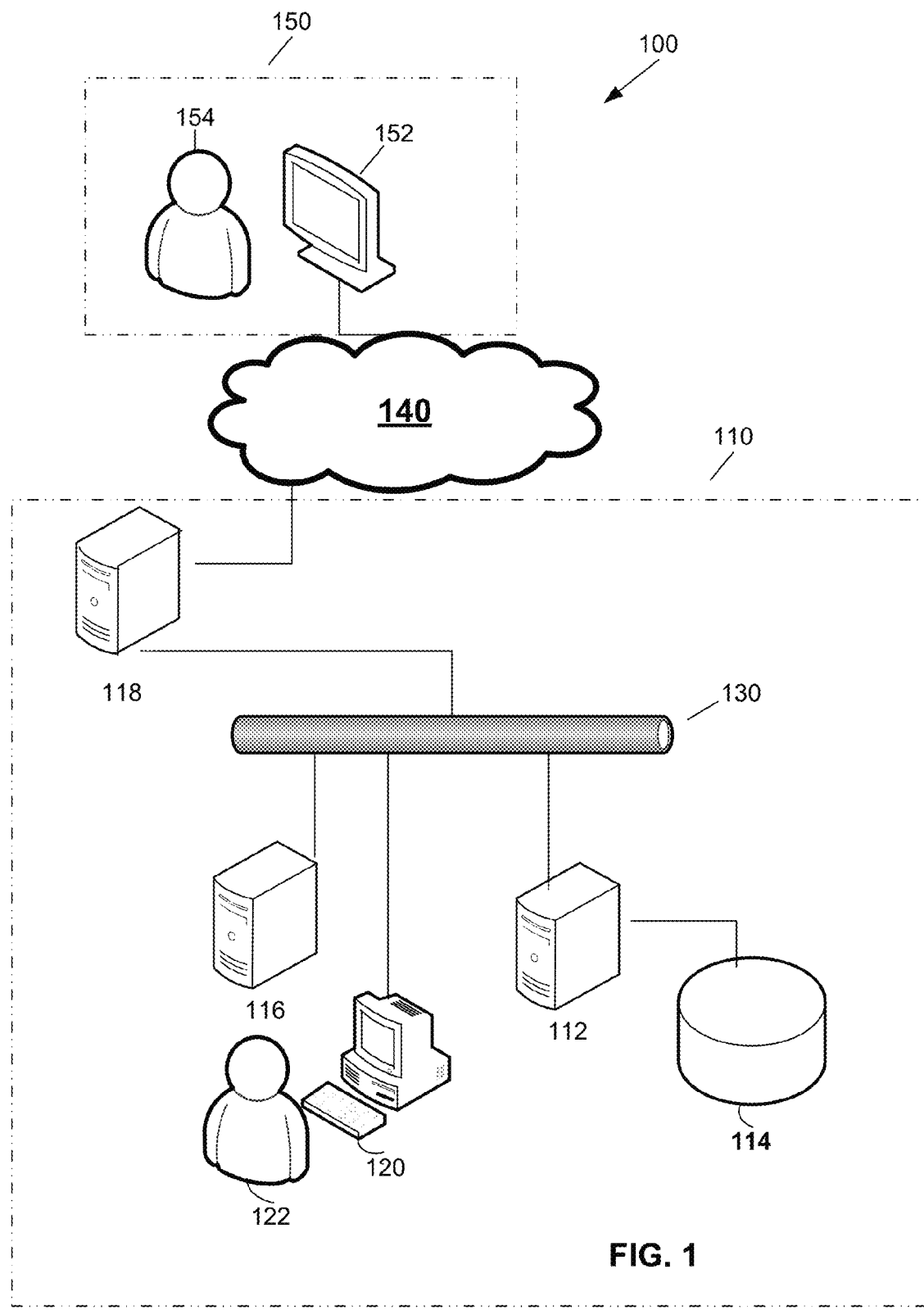
FIG. 1 is a conceptual sketch of an exemplary environment in which a security system may operate.

The inventors have recognized and appreciated that risks of unauthorized release of a software object may be reduced through marking objects with information acting as "fingerprints" of people who manipulate the object. The fingerprint may be inserted as part of object manipulations. The fingerprint provides information unique to the individual who manipulated the object such that the person may later be identified. The possibility that the person manipulating an object will be identified may reduce the likelihood that such a person will release an unauthorized build of a software product. Moreover, through identifying a person responsible for an unauthorized disclosure, further unauthorized disclosures by the same person may be foreclosed. Fingerprints may be applied in connection with any suitable type of software objects, such as an object for a new version of an operating system under development.

In some embodiments, a development environment for an operating system or other software product may be configured to mark the object with a fingerprint of each person controlling an operation involving manipulation of the object. For example, each server from which any such manipulation can be performed may be configured to automatically mark an object with the fingerprint of the person controlling the operation each time such an operation is performed. The operations for which such a fingerprint is applied to an object may relate to creation of the object or copying of the object or moving of the object. Though, the fingerprint may be applied to the object in connection with any suitable operation.

In some embodiments, an object may contain a single fingerprint location and the fingerprint stored in this location may be overwritten as successive manipulations of the object occur. The object may be designed to initially include a default fingerprint which can be overwritten at the first manipulation of the object. Overwriting an existing fingerprint in this way may allow the marking to occur quickly so as not to disrupt normal operation of the developmental environment.

Within an entity performing development, the fingerprint may be overwritten at each of multiple steps in the process of creation and distribution of the object, such that the fingerprint in an unauthorized object found external to the development organization may indicate the identity of the last person within the organization to manipulate the object. This information may provide a useful starting point in responding to leaks of objects.

In some embodiments, the fingerprint may contain information from which a person controlling manipulation of the object can be identified. However, in some embodiments, the fingerprint may contain no personally identifiable information associated with any user. Rather, the fingerprint may contain information about the person that has been obscured through a one-way cryptographic function such that the information personally identifying the individual cannot be recovered. Nonetheless, if an unauthorized object is detected, information for any person suspected of being involved in the unauthorized release may be processed through the same one-way cryptographic function. The obscured information in the object may be compared to the information similarly generated for the suspected individual to determine whether the suspected individual was the last person within the developmental organization to manipulate the object.

In some embodiments, a simple mechanism may be used to mark an object with a fingerprint. For example, the fingerprint may be inserted into a predefined location within the object. In some embodiments, a fingerprint, when first inserted into the object, may overwrite a component of the object that is initially included in the object as a placeholder for the fingerprint. For example, the object may be designed such that when the object is built, it includes a file that is not otherwise required for operation of the object. This file may be overwritten when a fingerprint is inserted into the object. Storing the fingerprint in a predefined location may simplify the processing required to mark an object because only a simple modification of the object is required to mark it.

Techniques that foreclose unauthorized removal of a fingerprint may also be employed. In some instances, the object may include a component that checks for the existence of a valid fingerprint. If no valid fingerprint is detected when the object is executed, that component may disable the object. Moreover, obfuscation techniques may be used to prevent detection of the fingerprint or the component that enforces a requirement for the presence of a valid fingerprint. For example, the component that checks for a valid fingerprint may initiate actions to disable the object at a random time after failing to detect a valid fingerprint. These actions may include selecting random locations within the object to corrupt. As a result, the object may cease operation at some random time for a seemingly random reason, making it difficult for a person attempting to defeat the enforcement mechanism to identify where it is within the object.

Turning now to FIG. 1, an example of an environment in which embodiments of a protection system may operate is provided. FIG. 1 illustrates a security system 100. FIG. 1 illustrates that components of security system 100 operate in a development environment 110 and in a runtime environment 150. The components of security system 100 operating in development environment 110 may insert one or more fingerprints into each software object that can be generated in the development environment 110. In this example, the software object created in development environment 110 is an executable version of an operating system of a computing device objects generated for any suitable software product may be marked as described herein. Though, it should be appreciated that the nature of the object marked with a fingerprint is not critical to the invention.

In the exemplary embodiment of FIG. 1, a single fingerprint is included in the object. However, the number of fingerprints inserted into the object is also not critical to the invention. For example, in some embodiments, multiple components within the object may be marked with a fingerprint using techniques as described herein.

In the embodiment of FIG. 1, the runtime environment 150 includes a component that enforces a requirement of a valid signature. In this example, the object contains an enforcement component such that if the object is executed on a computer, such as computer 152 by a user 154, the enforcement component may limit execution of the object if a valid fingerprint is not present in the object. In this way, a user 154 is precluded from obtaining information about the features and functionality of the software product if the object is not marked with a valid fingerprint. In scenarios in which a person within development environment 110 releases an unauthorized copy of the object for the purpose of allowing others to determine its features or functionality, the enforcement component within the object may thwart efforts to remove or alter a fingerprint associated with an object inserted in development environment 110.

The fingerprint may be inserted into the object in any suitable way within development environment 110. In the example illustrated, development environment 110 includes one or more servers performing functions as are known in the art. In this example, a server 112 and a server 118 are included in development environment 110. Server 112 may represent a development server of the type that manages access to a database 114 of software source code for a software product being developed. Development server 112 may access the source code in database 114 and create a build of the software product. The result of creating a build may be a software object that can be installed and executed.

During a development process for a software product, multiple builds may be created. Accordingly, development server 112 may, as part of creating a build, incorporate version information into the build, indicating a version of the software source code at database 114 used to create that build.

Some of these builds may be used for development purposes. Though, when the software source code in database 114 is finalized, a build may be legitimately distributed outside of development environment 110. Though, it may be undesirable for a build to be released while the software product is still under development.

A build may be distributed using techniques as are known in the art. In the embodiment illustrated, development environment 110 includes a distribution server 118. Distribution server 118 may package a build for distribution. Multiple distribution mechanisms may be used for a software object. For example, a software object may be copied to a disc or it may be distributed over a network, such as the Internet. Distribution server 118 may perform functions as appropriate for the mode of distribution. In the embodiment illustrated in FIG. 1, distribution server 118 distributes a software object over a network, such as the Internet 140. Though, it should be appreciated that the mode of distribution is not a limitation on the invention. To the contrary, development server 112 may be configured to create objects formatted for any of multiple distribution formats.

Operations within development environment 110 may be controlled by one or more people employed by an entity developing the software product. In this example, a person 122 is shown interacting with the development environment through a workstation 120. Person 122 may have security credentials that allows person 122 to access components within development environment 110. Those credentials may include a user ID, which may be assigned using techniques as are known in the art. These credentials may be used to gain access to the components in development environment 110.

Though FIG. 1 shows a single person 122, a single person is shown for simplicity of illustration. In a development environment such as might be found in an entity developing commercial products for sale, there may be multiple people that have access to the resources of development environment 110. Different ones of the people within development environment 110 may have different access privileges to different functions in the development environment. For example, a subset of the people employed by the entity offered in development environment 110 may have access to development server 112 such that they can modify software stored in database 114 and/or control development server 112 to construct a build. Another subset may have access privileges that allow them to control distribution server 118 to allow distribution of a software object outside of development environment 110. Though access to the functions that can be performed within development environment 110 may be restricted, there may nonetheless be numerous people that have credentials that allow them to perform one or more functions that can result in the unauthorized distribution of a software object for a software product under development.

To provide a mechanism to identify a person that is likely responsible for an unauthorized release of an object, components of distribution environment 110 may be adapted to insert a fingerprint of a person controlling manipulation of the object such that, if an unauthorized object is identified outside of development environment 110, a person responsible for the release may be identified. In the embodiment illustrated, though development server 112 and distribution server 118 perform functions as in a conventional development environment, those components may additionally insert a fingerprint into each object they process. The fingerprint may be generated in such a way as to be uniquely associated with a person controlling the operation that manipulated the object.

In the embodiment illustrated, the fingerprint may be generated using a key. For added security, the elements within development environment 110 that insert the fingerprint into an object need not have access to the key. Rather, key server 116 maintains the key. In the embodiment illustrated, each of the elements of development environment 110 that requires a fingerprint may, instead of accessing the key, provide the information used to generate the fingerprint to key server 116. Key server 116 may then generate the fingerprint and return it to the component of development environment 110 that will insert it into an object being processed.

Such an exchange of information may be possible because the components of development environment 110 may be interconnected with a network 130. Network 130 may be an enterprise network within the entity operating development environment 110. Though, it should be appreciated that any suitable mechanism of communication between the components of development environment 110 may be used.

In some embodiments, a fingerprint may be generated from information relating to the person that controlled an operation to manipulate an object. In addition, the fingerprint may be generated from information relating to an object. For example, the information about the object may include values of parameters such as a version number or a time of creation. The specific source of information about the object is not critical to the invention. Though, in the illustrated embodiment, information about the object is readily obtained from the object, itself, such as by reading a header file.

A fingerprint may be generated using any suitable processing. In the embodiment illustrated, key server 116 generates a fingerprint by computing the result of a one-way cryptographic function of the information identifying the person controlling an operation that manipulates an object. For example, a hash may be computed of the user ID of the person controlling the operation. Use of a one-way cryptographic function means that the specific identity of the person controlling the operation cannot be derived from the fingerprint. Though, the function may be such that for any two people with different user IDs, the chances of the same value being generated through the cryptographic function are so small as to be inconsequential.

Regardless of the manner in which the user information is processed, that processed information may be combined with information about the object. This information may then be signed with the key maintained within development environment 110. The signed information may then be inserted into the object during an operation involving manipulation of the object to act as a fingerprint of the person who controlled the operation on the object.

In the embodiment illustrated, key server 116 may maintain a private key associated with a public key/private key pair. A computing device within runtime environment 150 may be programmed to have or access the corresponding key of the key pair. As a specific example, computing device 152 in runtime environment 150 may have access to the public key corresponding to the private key maintained by key server 116. The object distributed with the fingerprint may contain a component that applies the public key to the signed fingerprint to validate that the fingerprint was signed within development environment 110. Conversely, if information stored at the location where a valid fingerprint was expected is not signed with a valid public key from key server 116, a component of the object executing in runtime environment 150 may detect that the fingerprint was removed, tampered with or for some other reason the copy of the object in runtime environment 150 is not a legitimate copy because it is lacking a valid fingerprint. In some embodiments, an object to be protected using the security techniques as described herein may contain an enforcement component that checks for a valid fingerprint and, if such a fingerprint is not found, takes a security measure, such as disabling the object.

The specific components within development environment 110 that insert fingerprints are not critical to the invention. In some embodiments, though, a fingerprint is inserted as part of each operation that might lead to an unauthorized distribution of an object. In the embodiment illustrated in FIG. 1, these operations include generating the object and making a copy of the object from a distribution server. Though, in some embodiments, any copy operation within development environment 110 may result in a fingerprint of the person controlling that operation being inserted in the object. In such a scenario, any component within development environment 110 that is capable of performing a copy operation or other operation that may precede an unauthorized release of an object, may be equipped to insert a fingerprint.

As can be seen from the example in FIG. 1, though, components within development environment 110 may be simply configured to insert a fingerprint. Any component within development environment 110 may obtain a fingerprint by interactions with key server 116.

Moreover, in some embodiments, a fingerprint is simply inserted into an object by overwriting information previously present in the object. For example, the object may be created with a default fingerprint such that when the first person within development environment 110 controls an operation manipulating the object, their fingerprint may overwrite the default fingerprint. Similarly, when subsequent users access an object that has already been fingerprinted within development environment 110, the fingerprint previously inserted in the object may be overwritten by a fingerprint of the person controlling an operation manipulating the object. Overwriting a fingerprint may be performed with a simple and fast operation such that incorporating a security measure as described may be performed simply without disrupting operation of the development environment. Though, it should be appreciated that any suitable mechanism may be used to insert fingerprints into an object.

Figure 2:
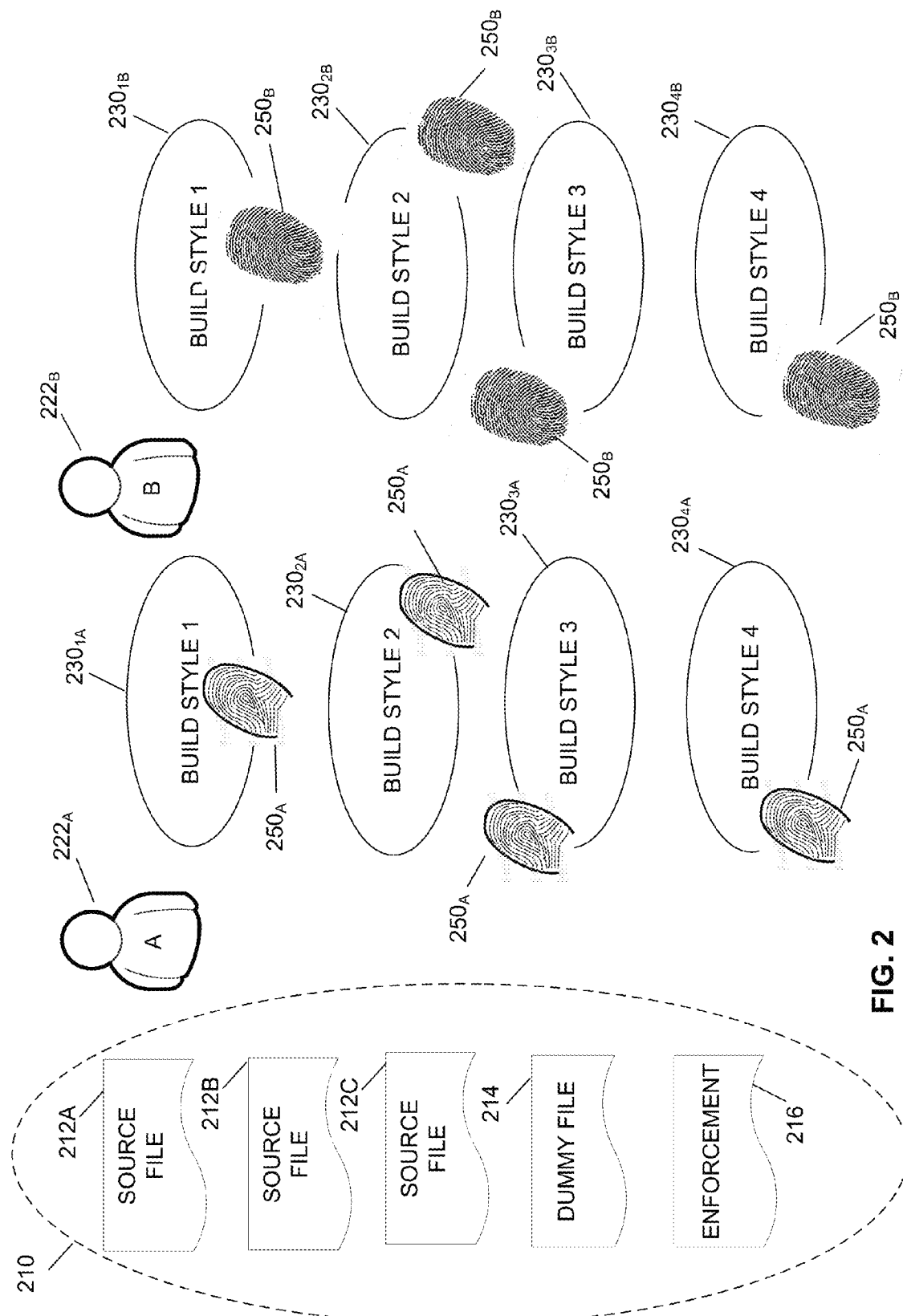
FIG. 2 is a conceptual sketch of an exemplary process of inserting fingerprints in objects.

FIG. 2 schematically illustrates the process of generating objects incorporating a fingerprint. FIG. 2 illustrates a code base 210. Code base 210 may, for example, represent source code files for a software product, such as may be stored in a developmental database 114 (FIG. 1). In this example, code base 210 corresponds to programming instructions implementing an operating system for a computing device.

In this example, the code includes multiple source code files, of which files 212A, 212B, and 212C are illustrated. In addition, the code base may include a dummy file 214. Dummy file 214 may be a file that has no functional purpose in connection with the operation of the software product defined by code base 210. However, the code base 210 may be configured such that when an object for the software product is built from the code base 210, dummy file 214 is incorporated into the object. In this example, dummy file 214 may contain information defining a default fingerprint. Accordingly, when an object is built from the code base 210, it contains a default fingerprint with a value determined from the contents of dummy file 214. Though, it should be appreciated that any suitable mechanism may be used to incorporate a default fingerprint into an object that is generated.

In addition, code base 210 includes source code defining an enforcement component 216. In this example, enforcement component 216 performs functions in the runtime environment to determine whether an object executing in that runtime environment includes a valid fingerprint and, if not, disables execution of the object.

It should be appreciated that FIG. 2 illustrates that code base 210 contains source files. It should be appreciated, however, that it is not a requirement of the invention that the code base for the software product under development be stored strictly in source code format. In some embodiments, some or all of the components within the code base 210 may be stored as library or executable components or in any other suitable representation.

Regardless of the manner in which the components of the software product are stored in code base 210, the development environment may process those components to build an object. FIG. 2 illustrates a scenario in which a user 222A has controlled a development environment to generate an object from code base 210. In this example, objects of multiple build styles may be generated. These build styles, for example, may correspond to various formats in which a distribution of the object may occur. A specific build style, for example, may be provided for objects intended to be distributed electronically. Different styles may be provided for different distribution mechanisms. For example, further styles may be provided for objects distributed on disk and other media that may be employed to distribute the software product. Though each of the objects for the different build styles may be functionally equivalent, the location of each of the components from code base 210 may be located differently in each of the build styles. Significantly, dummy file 214, which defines the default fingerprint in each of the build styles, may be located differently in each of the build styles.

Nonetheless, the location or locations of the default fingerprint incorporated as a result of dummy file 214 may be determined regardless of the build style. That default fingerprint may be overwritten by a fingerprint computed for person 222A. In this example, a fingerprint 250A is computed for person 222A. This fingerprint may be based on user ID, or other distinguishing, personal information, for user 222A in combination with information about the code in code base 210 at the time person 222A controlled the development environment to generate an object from code base 210.

FIG. 2 schematically shows that fingerprint 250A may be inserted into object $230_{1A}$, $230_{2A}$, $230_{3A}$, or $230_{4A}$. Accordingly, regardless of the build style, the object created may be marked with the fingerprint of person 222A that controlled the creation of that object.

FIG. 2 further illustrates that the objects $230_{1A}$, $230_{2A}$, $230_{3A}$, and $230_{4A}$ may be further processed within a development environment. In this example, person 222B manipulates objects created by person 222A by copying them. Accordingly, because person 222B controls a copy operation, a fingerprint for person 222B may be inserted into the objects. FIG. 2 illustrates fingerprint 250B computed for person 222B. As with fingerprint 250A, fingerprint 250B may be computed from a user ID for person 222B in combination with information about the object. In this example, the fingerprint of person 222B is used to overwrite the fingerprint of person 222A. Accordingly, FIG. 2 shows object $230_{1B}$ with a fingerprint 250B. Object $230_{1B}$ may be the same style and functionally identical to object $230_{1A}$. However, object $230_{1B}$ may differ from object $230_{1A}$ in that fingerprint 250B has replaced fingerprint 250A. Similarly, objects of other styles are marked with the fingerprint of person 222B, if those objects arise from a manipulation controlled by person 222B. Accordingly, objects $230_{2B}$, $230_{3B}$ and $230_{4B}$ are shown corresponding to objects $230_{2A}$, $230_{3A}$, and $230_{4A}$, but with fingerprint 250B substituted for fingerprint 250A.

With this scenario for processing objects in a development environment, if an unauthorized copy of an object is discovered outside of a development environment, fingerprints for those people within the development environment suspected of releasing that object may be computed and compared to the fingerprint in the object. For example, if an unauthorized object is found with fingerprint 250A, it can be determined that the object was released after the operation controlled by person 222A and before any manipulation of that object performed under control of person 222B. Such information may provide a basis to investigate the unauthorized disclosure, and may lead to further evidence that the unauthorized disclosure was performed under control of person 222A.

Figure 3:
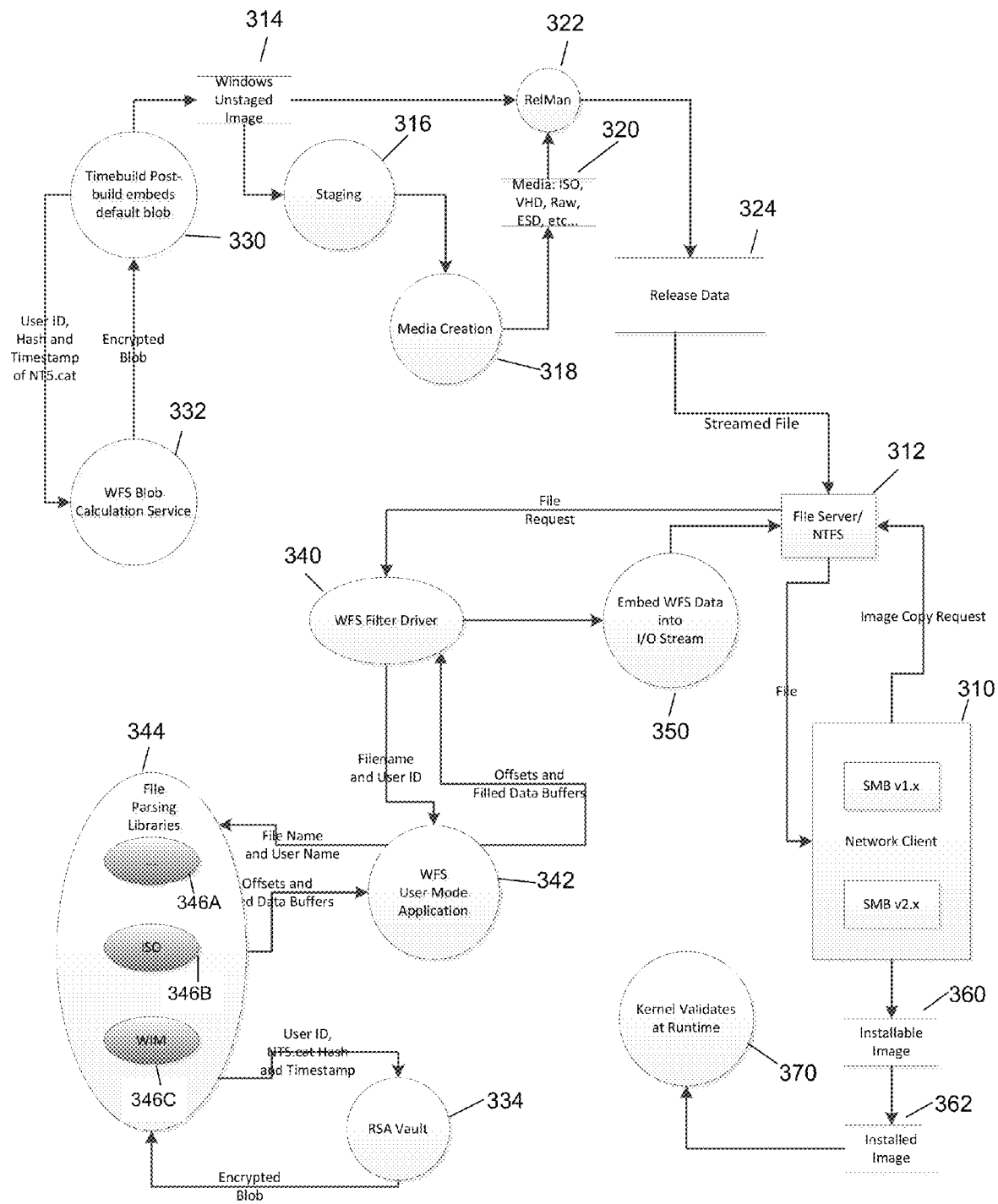
FIG. 3 is a block diagram of an exemplary embodiment of a security system for a software object.

Turning to FIG. 3, additional details of a security system that aids in determining the origin of unauthorized releases of objects are provided. In this example, the fingerprint is inserted into an object that is copied from a file server. FIG. 3 illustrates components that may supply a file responding to the copy request.

Accordingly, the system of FIG. 3 includes a network client 310. Network client 310 may request a copy of an object from a file server 312 within the development environment. If network client 310 is being operated by a person with valid credentials, file server 312 may respond to the copy request by obtaining and providing a copy of the requested file. File server 312 may respond even if the request is for a copy of an object under development that the person requesting the copy intends to improperly distribute.

For example, the object may be stored as an unstaged image 314. Prior to release, the unstaged image may be processed by a staging component 316. The staged image may be further processed by a media creation component 318, yielding one or more objects 320 in one or more build types suitable for one or more types of distribution. These objects may be managed by a release manager component 322. The release manager component 322 may provide either the unstaged image 314 or one of the object types 320, as appropriate based on the information requested in the copy request. Regardless of the format of the object, release manager 322 may provide this information as release data 324.

Staging component 316, media creation component 318 and release manager 322 may operate using techniques as are known in the art. Those components may also operate on data representing an object for a software product generally as is known in the art. However, in the embodiment illustrated, component 330 embeds a default fingerprint into the unstaged image 314. In the embodiment illustrated, the fingerprint is in the format of a binary large object (blob). In this specific example, the blob may be a 128-bit long string of data. The default fingerprint may be generated in any suitable way. In the embodiment illustrated, the default fingerprint is generated by a blob calculation service component 332.

In this example, component 332 receives as input a default user ID and a time stamp of an NT5.cat file containing information about the object. In this example, the NT5.cat file contains metadata about the object captured at the time it is built. As a result, the NT5.cat file contains a time stamp which may be used to identify a specific build that generated the object. Though, any suitable source of information may be used to obtain information about the object and/or any suitable information identifying the build.

Regardless of the source of the information, this information may be processed in the same way that a fingerprint is generated. As a specific example, the default user ID may be hashed and combined with the information and a hash of the NT5.cat metadata file and time stamp to generate the blob. The blob may be encrypted with the private key of the security system as a way of signing the blob. In some embodiments, component 332 may have access to the private key, itself. Though, in other embodiments, component 332 may interact with a signing component 334, which maintains the private key. The signing component 334 may return to component 332 the encrypted blob in response to a request containing the hashed user ID and hashed time stamp and metadata file.

Regardless of the manner in which the encrypted blob is generated, component 332 may provide the encrypted blob to component 330. Component 330 may embed the encrypted blob as a default fingerprint into the unstaged image 314.

In response to the copy command received from network client 310, the default fingerprint inserted into the unstaged image 314, may be replaced by a fingerprint generated for the person controlling network client 310 to request a copy of the object. In the embodiment illustrated, the security system may replace the default fingerprint with a fingerprint of that user by detecting that server 312 has received a copy request.

In the embodiment illustrated, server 312 is configured with a filter driver 340. Filter driver 340 intercepts commands received by server 312. Filter driver 340 passes information about requested files to security application component 342. In conjunction with the name of the file requested, driver 340 provides the user ID corresponding to the user logged in to network client 310 that issued the copy request.

Security application component 342 then interacts with a file parsing component 344. File parsing component 344 determines whether the requested file is a file to be marked with a fingerprint during the copy operation. In the embodiment illustrated, file parsing component 344 determines whether the requested file contains an object of a software product under development. Though, it should be appreciated that any suitable files may be marked with a fingerprint.

File parsing component 344 returns to user mode security component 342 an indication of whether the requested file should be marked with a fingerprint. If the requested file is not of a type to be marked, the copy operation may proceed as in a conventional server. However, if the requested file is a file to be marked, file parsing component 344 returns to user mode security component 342 information defining the fingerprint and information defining the location or locations within the requested file where the fingerprint is to be inserted.

The specific location or locations at which fingerprint data is to be inserted at the requested file may depend on the type of object requested. In this example, file parsing component 344 may contain sub-components to process different types of objects to determine a location or locations to overwrite with fingerprint data. Such locations may be identified in any suitable way including being preconfigured based on the build type for which a requested file was created. To support processing of different types of objects, file parsing component 344 may contain multiple subcomponents for parsing files of different types. For example, subcomponent 346B may parse a file constituting an object prepared for distribution on a disk. In contrast, subcomponent 346C may parse an object prepared for distribution as part of an electronic download. Subcomponent 346A represents a component for parsing an object created for distribution in some other way, and may represent processing to be performed on any suitable type of object.

Each subcomponent may perform one or more functions, including determining whether the requested file is, in fact, one that is to be marked with a fingerprint. Another function that may be performed is specifying what data is to be injected into the file. In the embodiment illustrated, each of the parsing subcomponents, such as subcomponents 346A . . . 346C, may obtain an encrypted blob from signing component 334 based on the user ID of the user requesting a copy of a file. The specific parsing subcomponent may provide to signing component 334 a blob formed from hashing the user ID and combining it with a time stamp, from an NT5.cat file associated with the object. This information may then be encrypted by signing component 334 and returned to the parsing subcomponent. Based on this encrypted blob, the parsing subcomponent may determine specific values to be inserted at the designated vocations within the requested file. The parsing subcomponent may return this information in any suitable format. In some embodiments, the information may be returned as a list of offsets into the file, with each offset indicating a designated location at which information is to be injected. The specific information to be injected may be recorded in a buffer returned from the specific parsing subcomponent to user mode security component 342. Furthermore, in some embodiments, objects may be compressed or encrypted such that a fingerprint cannot be inserted simply by direct replacement. Rather, the object in unencrypted and/or uncompressed form may be altered by insertion of the fingerprint. The altered image may then be recompressed and/or re-encrypted to determine which locations must be replaced with which values to achieve the effect of inserting in the object the fingerprint of the user requesting a copy. Because the specific operations require to determine the specific bits to insert in a file and the locations at which those bits are to be inserted may depend on the type of the object, each type of object may have a corresponding subcomponent as illustrated in FIG. 3. Additionally, in some embodiments, altering a portion of an object, by replacing one fingerprint for another, may necessitate other changes to the object for it to continue to function correctly. A subcomponent associated with each type of object may be configured to determine these and other changes to the object to insert a fingerprint.

Additionally, the fingerprint generated for each object type may be based on information associated with the object. The specific information used in generating the fingerprint may preferably be readily available at runtime. Accordingly, different object types may have different types of information available at runtime. The parsing component associated with each type of object may specify the specific information for the object type to be used in generating a fingerprint for that object type.

Regardless of the object type, the information contained in the buffers, may be returned to the user mode security component 342, in combination with the offsets for the file at which that information is to be replaced. This information then may be passed from user mode security component 342 to the filter driver 340.

Filter driver 340 may pass that information to component 350 which monitors the stream of data being passed through the filter driver, representing an information stream containing the results of the copy command. Upon detecting a location identified by the offsets produced by the parsing subcomponent, component 350 may replace the information at that location in the data stream file with information from the buffer, representing the fingerprint to be injected into the copied file. In this way, the fingerprint may be injected into the appropriate location or locations in the file being copied without expressly modifying the copy command and/or alerting the person that generated the copy request.

Nonetheless, network client 310 receives the streamed file, with the designated locations replaced by appropriate fingerprint information. In this example, the copied file may be an installable image of the object 360. That image may be installed to create an installed image 362. The installed image 362 may include a runtime validation component 370. The runtime validation component, in the embodiment illustrated in which the object corresponds to an operating system of a computing device, may be a component within the kernel of the operating system.

Regardless of the manner in which the runtime validation component is implemented, it may execute at runtime. In this example, the runtime validation component 370 is programmed with information defining where in the installed image 362 the fingerprint inserted in the downloaded file may be located. Accordingly, the runtime validation component may access the signature and determine whether it represents a valid fingerprint. In the specific example of FIG. 3, the fingerprint is encrypted by signing component 334 using a private key. The runtime validation component 370 has access to the corresponding public key for the private key used by signing component 334. The public key may be stored in any suitable way within the installed image 362. In some embodiments, operating systems include key stores or other mechanisms for storing security information. The public key corresponding to the private key used by signing component 334 may be stored in such a key store or in any other suitable way.

Regardless of the manner in which the key is stored, runtime validation component 370 may access that key to decrypt the encrypted blob representing the fingerprint. Components of the decrypted blob may then be analyzed to determine whether the blob constitutes a valid signature. As a specific example, in the illustrated embodiment, the unencrypted blob may contain four portions. A first portion may be a header identifying the blob as a fingerprint. A further portion may be a non-reversible hash derived from the account credentials of the individual requesting the copy demand. A third portion may indicate the creation time of the object. A fourth portion may be a hash of multiple pieces of metadata about the object. In some embodiments, each time an object is built, an NT5.cat file may be created, containing information about the object. The unencrypted blob may contain a hash of the entire contents of this file.

In the embodiment illustrated, the runtime validation component 370 may access comparable information about the object that is retained as part of the installed image 362. As a specific example, the NT5.cat file may be retained in the installed image, such that the time stamp associated with the object may be accessed. Similarly, the entire content of that file may be accessed and hashed in the same manner used to create a valid signature. The hash of the metadata about the object generated at runtime and the time stamp for the object may be compared to those from the unencrypted blob. If the information generated at runtime matches the information in the unencrypted blob, the unencrypted blob may be deemed to contain a valid fingerprint. If not, the installed image may be deemed to correspond to an unauthorized or tampered with copy. In response to such a determination, the runtime validation component 370 may disable the object to prevent it from operating.

Figure 4:
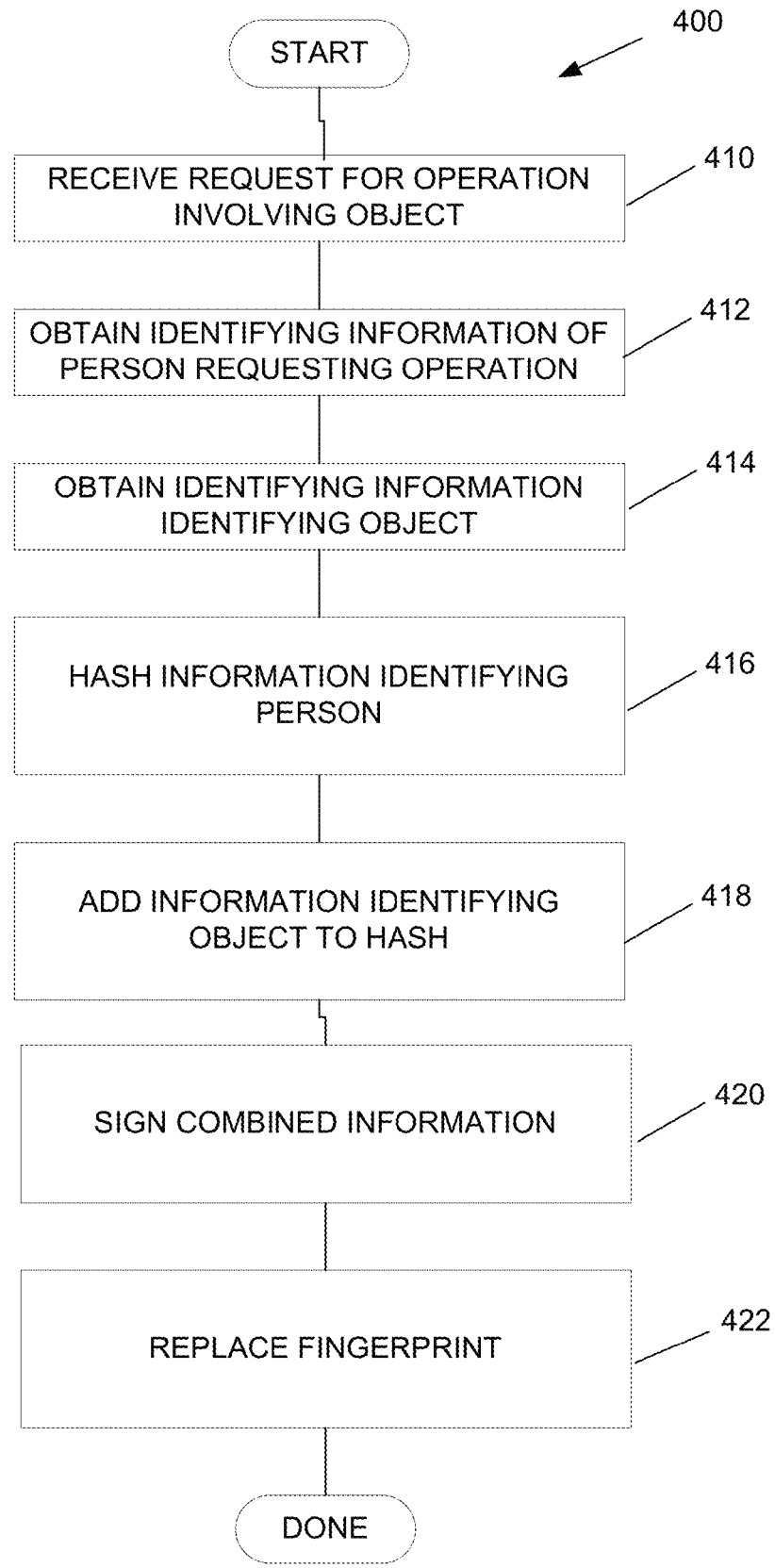
FIG. 4 is a flow chart of an exemplary process of operating a component of a security system in a development environment.

Turning now to FIG. 4, a method of operating a component in a development environment is illustrated. The method 400 may be performed by any suitable component in a development component. For example, the method may be performed by a distribution server, such as distribution server 118 (FIG.

1). Though, any server that may perform an operation that could lead to an unauthorized release of an object may be configured to perform method 400.

In the example illustrated in FIG. 4, method 400 begins at block 410. At block 410, a request for an operation involving an object is received. This request may be received in any suitable way, including by monitoring commands received by the component executing method 400 and intercepting those commands requesting an operation involving an object to be protected by a security system.

Regardless of the manner in which the request for an operation is received, method 400 may proceed to block 412. At block 412, information identifying a person requesting the operation received at block 410 may be obtained. Any suitable identifying information may be used. In some embodiments, the identifying information may constitute a portion of a credential used by the person to gain access may be used as identifying information. As a specific example, each person allowed access to an object may be assigned a user ID. The user ID may be the identifying information obtained at block 412. Though, it should be appreciated that any suitable identifying information may be used.

At block 414, identifying information about the object may be obtained. This information also may be obtained in any suitable way. In embodiments in which objects are generated based on builds of a software product, the identifying information may identify a specific build of the object. The build may be identified in any suitable way, such as from a time stamp indicating the time at which the build occurred. Though, other information may alternatively or additionally be used to identify the object. In some scenarios, some or all of the information identifying the object may be hashed and the hash of the identifying information may be used.

Regardless of the manner in which information identifying the person and information identifying the object are obtained, method 400 may proceed to block 416. Processing at block 416 may entail a one-way cryptographic function such that the specific identity of the person cannot be recovered. As a specific example, at block 416, the information identifying the person may be hashed.

At block 418, the hash of information identifying the person may be combined with information identifying the object. This information may be combined in any suitable way. In the embodiment illustrated, the combination may be performed in such a way that the hash of information identifying the person may be separated from information used to identify the object. As a simple example, the hash of information identifying the person may occupy a first portion of the bits in a blob. The information identifying the object may occupy a second portion of the bits in a blob.

Regardless of the manner in which the hash of information identifying the person is combined with information identifying the object, the combined information may be signed at block 420. Signing at block 420 may be performed in accordance with any suitable cryptographic process, including cryptographic processing as is known in the art. The signature may be generated using a private key accessible to the component executing method 400. In some embodiments, the blob created at block 418 may be signed by encrypting the blob using the key.

Regardless of the manner in which the combined information is signed, the signed information created at block 420 may act as a fingerprint of a person requesting the operation on the object at block 410. At block 422, this information may be used to replace a fingerprint already within the object. In the scenarios in which method 400 represents processing during a first controlled operation on an object, processing at block 422 may entail overwriting information included by default in the object. Such information may, for example, be a default fingerprint having the same form as a fingerprint created at block 420. In scenarios in which the object has been previously the subject of an operation that resulted in the generation of a fingerprint, processing at block 422 may entail replacing that fingerprint previously inserted into the object.

Figure 5:
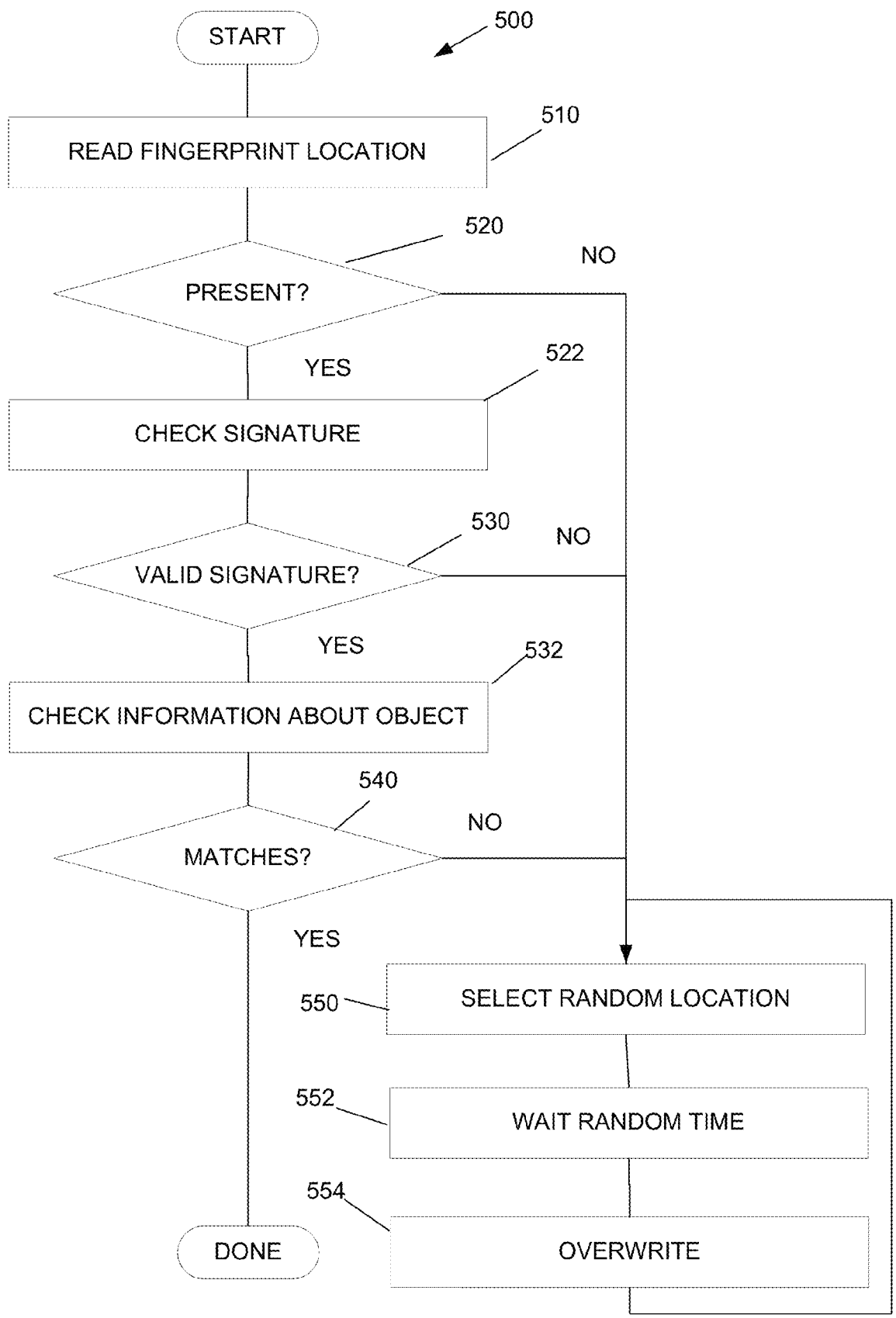
FIG. 5 is a flow chart of an exemplary process of operating an object to implement security in a runtime environment.

Once the fingerprint is replaced at block 422, the operation requested at block 410 may complete as in conventional processing. Completing the method 400 may result in a distribution of the object such that it may be available for execution on a computing device. In some embodiments, the object may incorporate an enforcement component that may operate according to method 500 as illustrated in FIG. 5.

In scenarios in which the object is an operating system, the enforcement component may be a kernel mode component within the operating system. Though, the specific mechanism by which an enforcement component is incorporated into the object is not critical to the invention.

Regardless of the manner in which the method 500 is executed, the method may begin at block 510. At block 510, the enforcement component may read information stored at one or more designated fingerprint locations. The location or locations read at block 510 may correspond to locations in the memory of the computing device on which method 500 is executed where the fingerprint, if properly included in the object, is stored when the object is installed on that computing device. The location may be designated in any suitable way. For example, it may be designated by an absolute memory address, by an offset in memory measured from a location where a beginning of the object is installed. Alternatively or additionally, the location may be designated dynamically, by using a file name or other identifier to determine the location of the fingerprint.

At decision block 520, method 500 may branch, depending on whether information in a format of a fingerprint is present at the accessed location or locations. For example, in embodiments in which a fingerprint is stored as a file, if no file is present at the designated location processing may branch from decision block 520 to block 550. In this example, block 550 represents the beginning of a subprocess in which the object is disabled.

Conversely, if information in the format of a fingerprint is present in the accessed locations, the method 500 may branch from decision block 520 to block 522. At block 522, a cryptographic operation may be performed on the information accessed from that location to check whether that information has been properly signed. In the embodiment illustrated, the check at block 522 may entail determining whether the information is signed with a pre-determined key used by the security system in a development environment. Such processing may entail attempting to decrypt the information read from the location at block 510. Such processing may be performed as is known in the art using a key that is part of a pair with a key used in the development environment to encrypt fingerprint information. The key used at block 522, for example, may be the public key corresponding to a private key used in the development environment.

Following processing of block 522, method 530 may branch, depending on whether the signature of the information read at block 510 is valid. Any suitable mechanism may be used to determine whether the signature is valid. For example, the signature may be deemed to be valid when, as a result of the processing at block 522, the information read at block 510 is determined to have a header indicating that the information constitutes a fingerprint or any other suitable characteristics indicating that the information is formatted as a fingerprint.

Regardless of the manner in which the signature is validated, if the accessed information does not contain a valid signature, method 500 may again branch to block 550. Alternatively, if the information is determined to have a valid signature, method 500 may proceed to block 532.

At block 532, the fingerprint is checked to determine whether it contains information about the object that was used to install the component executing method 500. The check performed in block 532 may be performed in any suitable way. For example, a component may read information about the object used to install the executing image of an operating system. The information read may be header information. The header information obtained at block 532 may be the same type obtained at block 414 (FIG. 4). In this way, the information obtained from the object installed in a runtime environment may be compared to information about the object used to generate the fingerprint read at block 510. A comparison of the information about the object in the runtime environment and the object for which the fingerprint was generated allows the enforcement component to recognize whether the fingerprint detected at runtime was copied from another object, possibly to obscure the identity of the person who released the object installed in the runtime environment. Accordingly, if the information about the object read from the fingerprint does not match the information about the object executing in the runtime environment, method 500 may branch at decision block 540 to block 550.

Processing at block 550 represents the beginning of a sub-process in which the object is disabled. Any suitable technique may be used for disabling the object. Though, in the embodiment illustrated, the object is disabled in a way that obscures the enforcement component. In this example, that processing includes selecting a random location of the installed image of the object at block 550. At block 552, the enforcement component waits a random time. At block 554, the enforcement component overwrites the randomly selected location after waiting the random time. Overwriting at block 554 may eventually create an error halting execution of the object. Though, if overwriting one location at block 554 does not halt execution of the object, the process may loop back to block 550. As shown, the process of selecting and corrupting random locations may continue until the executing object crashes.

Figure 6:
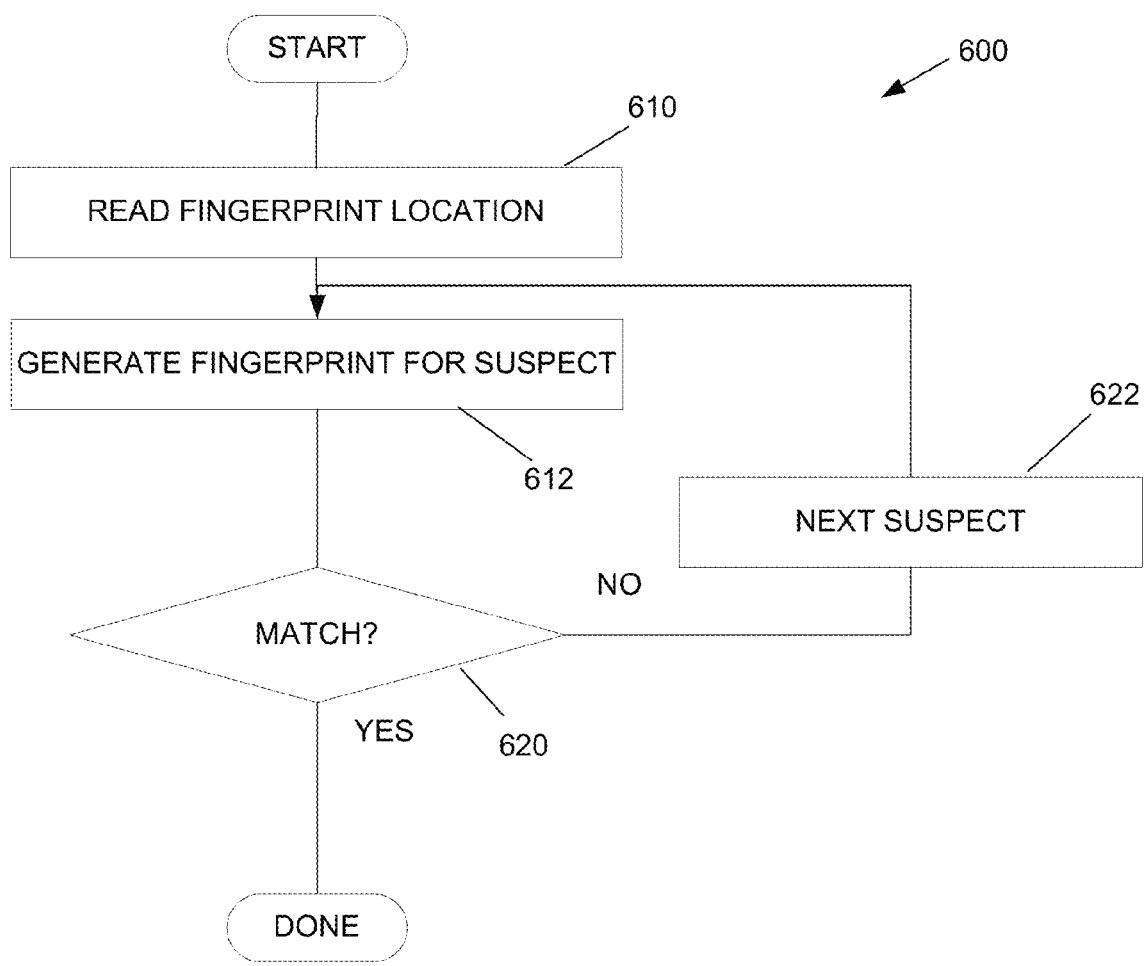
FIG. 6 is a flow chart of an exemplary method of identifying a person responsible for leaking an object.

Conversely, in scenarios in which the fingerprint read at block 510 is validated as both being in the format of a valid signature and matching the specific object that is executing, method 500 may branch from decision block 540 to the end. When method 500 reaches the determination point in this fashion, the object may then continue to execute normally. An enforcement mechanism as illustrated in FIG. 5 may help ensure that a fingerprint inserted in an object in a development environment is maintained in that object even after the object is released from the development environment because removing or replacing the fingerprint may result in the object ceasing to execute. As a result, if an object is detected, it is likely to retain the fingerprint inserted in the object in the development environment. A person controlling an operation that preceded the release of the object from the development environment can be identified from that fingerprint. Accordingly, if an unauthorized copy of an object is found outside of the development environment, the fingerprint of that object may be used in an investigation to determine a responsible person. FIG. 6 illustrates a method 600 that may be performed on such an unauthorized object. Method 600 may be executed on any suitable computing device. Though, in some embodiments, the method 600 may be implemented within a development environment or other secure area where access to personally identifying information, such as a user ID, used to generate a password can be had in a secure fashion.

Method 600 in this example is shown to begin at block 610. In block 610, information is read from the fingerprint location of the object. Processing at block 610 may be performed in the same way as processing at block 510. Though not expressly shown in FIG. 6, processing of method 600 may entail processing such as shown in FIG. 5 to determine whether the information read at block 610 is a valid fingerprint for the object and to recover from that fingerprint a hash of user information used to generate that fingerprint.

Regardless of the specific techniques by which a fingerprint is obtained for the object, processing may arrive at block 612.

At block 612, all or a portion of a fingerprint is generated for a person suspected of making the unauthorized release of the object. Any suitable mechanism may be used for identifying a suspect at block 612. Though, in some embodiments, the identified suspects are limited to people in the development environment that had access privileges sufficient to create, copy and/or otherwise manipulate the object in a way that could lead to an unauthorized release.

Regardless of the manner in which a suspect is identified, a fingerprint for the suspect may be generated at block 612. Processing at block 612 may be performed using processing as illustrated in connection with FIG. 4 to generate a fingerprint. Though, in some embodiments, processing at block 612 may entail generating only a portion of the fingerprint. For example, processing at block 612 may entail generating hashed information identifying a person, such as is described in connection with block 416 (FIG. 4) (above).

Regardless of the extent of information generated at block 612, it may be compared to corresponding information in the fingerprint read at block 610. If the information matches, the suspect for which the fingerprint information was generated in block 612 may be further investigated as a person possibly involved in the release of the unauthorized object. Conversely, if the fingerprint information generated at block 612 does not match information recovered from the fingerprint read at block 610, the method 600 may branch from decision block 620 to block 622. At block 622, a further suspect may be identified. If further suspects remain, the method 600 may loop back to block 612 where the process of comparing fingerprints is repeated for the additional suspect.

In this way, a security system may be implemented that provides a substantial disincentive for a person to make an unauthorized release of an object. Though, the security system is implemented in such a way that personally identifying information about people in a development environment manipulating the object is not disclosed.

Figure 7:
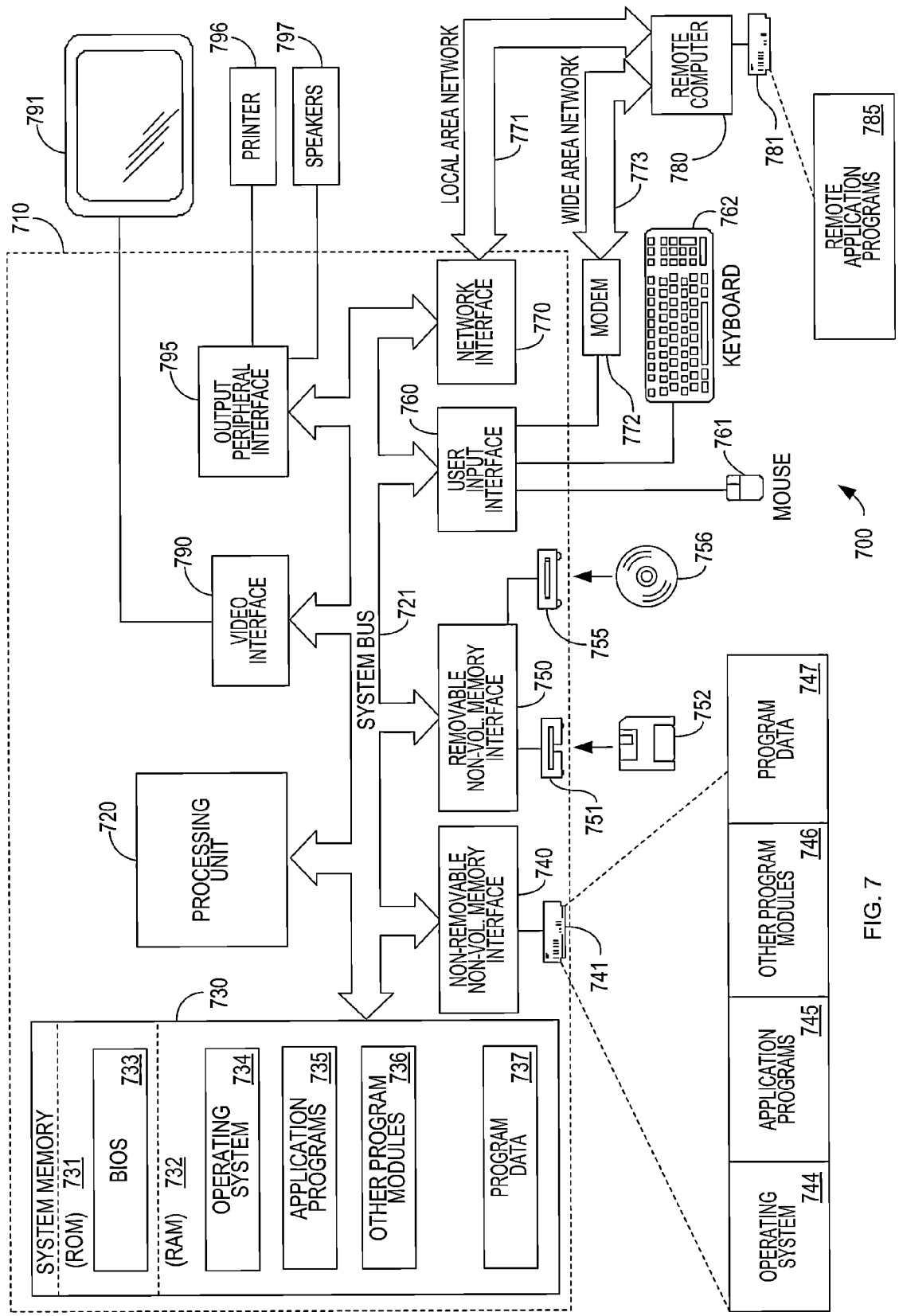
FIG. 7 is a block diagram of an exemplary computer system that may be used to implement portions of a security system.

FIG. 7 illustrates an example of a suitable computing system environment 700 on which the invention may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. For example, though operation of a security system in connection with an operating system described, techniques as described herein may be used in connection with any suitable software product.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of processing a software object, the method comprising:
   in conjunction with an action involving manipulation of the object:
      obtaining information identifying a person controlling the action;
      with at least one processor, cryptographically generating obfuscated data based on the information identifying the person and information identifying the object; and
      incorporating the obfuscated data in the object, the object comprises a component associated with a second key of a key pair, the component being adapted to verify that the obfuscated data comprises the information identifying the object based on the second key and the information identifying the object;
   wherein the cryptographically generating the obfuscated data comprises:
      computing a hash of the information identifying the person;
      combining the hash with the information identifying the object to produce combined information; and
      signing the combined information with a first key of a key pair.

2. The method of claim 1, wherein:
   the action comprises making a build of the object.

3. The method of claim 1, wherein:
   the action comprises making a copy of the object.

4. The method of claim 1, further comprising:
   obtaining the key from a server configured to manage release of versions of the object from a development environment.

5. The method of claim 1, wherein:
   incorporating the obfuscated data in the object comprises overwriting a file in the object.

6. The method of claim 1, wherein:
   the object comprises an operating system for a computing device.

7. A method of executing an object on a computing device, the method comprising:
   accessing a first component of the object;
   by a second component of the object executing on at least one processor, determining whether the first component is valid by, with the at least one processor:
      by using a second key of a key pair, checking whether the first component was signed with a predetermined key which is a first key of the key pair; and
      checking whether the first component contains information identifying the object;
   when the first component is valid, executing the object; and
   when the first component is not valid, disabling the object.

8. The method of claim 7, wherein:
   disabling the object comprises disabling the object at a random time after determining whether the encrypted component is valid.

9. The method of claim 8, wherein:
   disabling the object comprises:
      randomly selecting portions of the object; and
      modifying the randomly selected portions.

10. The method of claim 7, wherein:
    accessing the first component comprises reading a file from a predetermined location within the object.

11. The method of claim 7, wherein:
    the determining comprises indicating that the first component is not valid when the first component is absent from a predetermined location within the object.

12. At least one computer readable storage device comprising an object, the object comprising computer-executable instructions that, when executed on a computing device, implement an operating system of the computing device, the computer-executable instructions comprising:
    a kernel of the operating system, the kernel comprising a component that:
       accesses security information incorporated in the object;
       accesses information identifying the object;
       determines whether the security information is formatted as a valid fingerprint, the determining whether the security information is formatted as the valid fingerprint comprises determining whether a signed fingerprint is signed with a first key of a key pair using a second key of the key pair; and
       when the security information is not formatted as the valid fingerprint, disables the object.

13. The at least one computer readable storage device of claim 12, wherein:
    the component disables the object by:
       randomly selecting portions of the object; and
       corrupting the randomly selected portions.

14. The at least one computer readable storage device of claim 12, wherein:
    the component disables the object by corrupting portions of the object at random times.

15. The at least one computer readable storage device media of claim 12, wherein:
    the determining whether the security information is formatted as a valid fingerprint further comprises determining whether the signed fingerprint contains information identifying the object.

* * * * *